(12) United States Patent
Chang

(10) Patent No.: US 9,409,381 B2
(45) Date of Patent: Aug. 9, 2016

(54) REUSABLE MULTILAYER AND MULTIFUNCTIONAL FLOOR UNDERLAY

(71) Applicant: Chi-Feng Chang, New Taipei (TW)

(72) Inventor: Ta-Wei Chang, New Taipei (TW)

(73) Assignee: Chi-Feng Chang, New Taipei (TW)

( * ) Notice: Subject to any disclaimer, the term of this patent is extended or adjusted under 35 U.S.C. 154(b) by 0 days.

(21) Appl. No.: 14/830,811

(22) Filed: Aug. 20, 2015

(65) Prior Publication Data

US 2016/0053497 A1  Feb. 25, 2016

(30) Foreign Application Priority Data

Aug. 21, 2014  (TW) .............................. 103128874 A
Aug. 21, 2014  (TW) .............................. 103214980 U

(51) Int. Cl.
*E04F 15/16* (2006.01)
*B32B 29/00* (2006.01)
(Continued)

(52) U.S. Cl.
CPC ................ *B32B 29/002* (2013.01); *B32B 5/022* (2013.01); *B32B 5/16* (2013.01); *B32B 5/245* (2013.01);
(Continued)

(58) Field of Classification Search
CPC ............ B32B 5/022; B32B 5/26; B32B 7/06; B32B 7/12; B32B 21/02; B32B 21/10; B32B 27/02; B32B 27/08; B32B 27/10; B32B 27/32; B32B 27/12; B32B 27/304; B32B 29/02; B32B 2262/0253; B32B 2262/0261; B32B 2262/0276; B32B 2262/06; B32B 2262/08; B32B 2262/101; B32B 2262/14; B32B 2307/724; B32B 2307/7265; B32B 2307/744; B32B 2307/50; B32B 2307/54; B32B 2307/7145; B32B 2307/718; B32B 2307/7246; B32B 2471/00; B32B 2419/04; B32B 2305/20; B32B 2260/021; B32B 2260/046; B32B 2270/00; B32B 37/153; B32B 3/10; B32B 2405/00; B32B 38/10; C09J 7/0296; C09J 7/0289; C09J 2409/006; E04G 21/30; Y10T 428/1476; Y10T 428/31692; Y10T 428/31938; Y10T 428/31551; Y10T 428/24504; Y10T 428/1452; Y10T 428/249983; Y10T 442/2525; Y10T 442/291; Y10T 442/659; Y10T 442/2139; Y10T 442/678; Y10T 442/2861; Y10T 442/2893; Y10T 442/2533; Y10T 442/674; Y10T 442/2049; Y10T 442/671; Y10T 442/2992; Y10T 442/67; Y10T 442/2041; Y10T 442/601; Y10T 442/2918; Y10T 442/2762; D04H 13/006; E04F 15/08; E04F 15/18; E04F 15/02155; E04F 15/0215; E04F 15/203; E04F 13/21; E04F 13/0887; G09F 3/02; G09F 19/228; G09F 19/22; G09F 2003/0257

See application file for complete search history.

(56) References Cited

U.S. PATENT DOCUMENTS

| | | | |
|---|---|---|---|
| 2005/0034341 A1* | 2/2005 | Leutton ..................... | G09F 3/02 40/594 |
| 2006/0210753 A1* | 9/2006 | Kadlec .................... | B32B 5/022 428/41.8 |

(Continued)

*Primary Examiner* — Patricia L Nordmeyer
(74) *Attorney, Agent, or Firm* — Rosenberg, Klein & Lee

(57) ABSTRACT

The present invention relates to a floor underlay, which is reusable and has multilayer and multifunctional characteristics. The floor underlay is used for joining the floor and floor decoration sheets. The structure of the floor underlay comprises adhesive layers, support layers, waterproof layers, and a multiple-media intermediate layer. The multiple-media intermediate layer is formed by mixing a plurality of medium particles. The medium particles are formed by elastic materials, such as rubber, rubber foam, polyurethane, or polyurethane foam. Thereby, the floor including the floor underlay will have the vibration absorption, sound absorption, flame resistive, and fall prevention functions.

10 Claims, 2 Drawing Sheets

(51) Int. Cl.
  *B32B 5/02*   (2006.01)
  *B32B 5/16*   (2006.01)
  *B32B 5/24*   (2006.01)
  *B32B 7/06*   (2006.01)
  *B32B 7/02*   (2006.01)
  *E04F 15/02*  (2006.01)
  *E04F 15/20*  (2006.01)

(52) U.S. Cl.
  CPC ... *B32B 7/02* (2013.01); *B32B 7/06* (2013.01); *E04F 15/02155* (2013.01); *E04F 15/166* (2013.01); *E04F 15/203* (2013.01); *B32B 2262/065* (2013.01); *B32B 2262/067* (2013.01); *B32B 2266/0207* (2013.01); *B32B 2266/0278* (2013.01); *B32B 2307/102* (2013.01); *B32B 2307/3065* (2013.01); *B32B 2307/56* (2013.01); *B32B 2405/00* (2013.01); *B32B 2419/04* (2013.01); *B32B 2471/00* (2013.01); *Y10T 428/14* (2015.01); *Y10T 428/28* (2015.01); *Y10T 428/2848* (2015.01)

(56) References Cited

U.S. PATENT DOCUMENTS

| | | | |
|---|---|---|---|
| 2009/0218030 A1* | 9/2009 | LaVietes | B32B 27/12 156/71 |
| 2011/0305908 A1* | 12/2011 | D'Agostino | E04F 15/08 428/423.1 |
| 2013/0167463 A1* | 7/2013 | Duve | E04F 13/21 52/390 |
| 2014/0190616 A1* | 7/2014 | Archbold | C09J 7/0289 156/71 |

* cited by examiner

REUSABLE MULTILAYER AND MULTIFUNCTIONAL FLOOR UNDERLAY

FIELD OF THE INVENTION

The present invention relates generally to an underlay, and particularly to a reusable floor underlay disposed between the floor and the floor decoration sheets such that the decorated floor will have vibration absorption, sound absorption, flame resistive, and fall prevention features.

BACKGROUND OF THE INVENTION

In recent years, do-it-yourself (DIY) has become a common practice. More people like to do things by themselves. Thereby, user-assemblable articles, particularly floor mats, are available for sale in shopping malls. Users can select various patterns and colors and assemble by themselves. In addition to save the construction fee, they can assemble floors with personal styles on their own.

The plastic or bamboo floor decoration sheets purchased by users are installed on the floor directly with functions only limited to improving the touch and visual style of the floor; none accessory function is includes. In other words, the floor will not have the sound and vibration absorption features after the floor decoration sheets are attached. In addition, the attachment between the floor decoration sheets and the floor is normally permanent. Once some stained or damaged floor decoration sheets are to be replaced or the floor style is to be adjusted seasonally, large-area destructive disassembling is very possibly required, resulting in waste of labor and materials.

Accordingly, in order to enable flexibility in floor decoration, an additional floor underlay is added between the floor and the floor decoration sheets, bringing incentives for innovation and business opportunities. The US patent publication No. US 2013/0177726 disclosed a floor underlay composed by a rubber interior layer for providing some elasticity. Outside the rubber interior layer, materials such as polypropylene, jute fabrics, or glass fibers are attached. On a still outer layer, high-adhesion adhesive is coated for achieving permanent attachment. When this type of floor underlay is attached to the floor and the floor decoration sheets, the stepping comfort of the floor can be improved. Nonetheless, the overall structure and material of this type of products still need to be improved for enhancing the functionality as well as the quality.

SUMMARY

An objective of the present invention is to provide a floor underlay, which is reusable and has multilayer and multifunctional features. In addition, it also has vibration absorption, sound absorption, flame resistive, and fall prevention functions. The floor underlay includes adhesive layers on both surfaces. One is connected to the floor, while the other is attached to floor decoration sheets of various materials, such as plastic sheets, wood sheets. Bamboo sheets, PVC, and rubber floor. Thereby, the floor decoration sheets attached directly to the floor originally can now include an additional auxiliary underlay with specific efficacies by users and thus giving the vibration absorption, sound absorption, flame resistive, and fall prevention functions.

Another objective of the present invention is to provide a floor underlay. The viscosity of both surfaces of the floor underlay can be different. According to the requirement, the surface with high viscosity can be torn by the user for replacing floor decoration sheets without residue. Thereby, the floor underlay has the advantages of beauty and convenience.

Still another objective of the present invention is to provide a floor underlay, which includes a waterproof structure therein. Hence, the lifetime of the floor underlay is extended. It will not deteriorate or mildew due to the influences of exterior moisture.

In order to achieve the above objectives, the present invention discloses a floor underlay used for joining a floor and a floor decoration sheet. The structure of the floor underlay comprises a first adhesive layers, a support layer, a first waterproof layer, a multiple-media intermediate layer, a second waterproof layer, a second support layer, and a second adhesive layer. The first adhesive layer is used for adhering to the floor. The first support layer is disposed on the first adhesive layer. The first waterproof layer is disposed on the first support layer. The multiple-media intermediate layer is disposed on the first waterproof layer and formed by mixing a plurality of medium particles. The second waterproof layer is disposed on the multiple-media intermediate layer. The second support layer is disposed on the second waterproof layer. The second adhesive layer is disposed on the second support layer and used for adhering to the floor decoration sheet.

DETAILED DESCRIPTION

In order to make the structure and characteristics as well as the effectiveness of the present invention to be further understood and recognized, the detailed description of the present invention is provided as follows along with embodiments and accompanying figures.

The floor underlay according to the present invention is disposed between the floor and the floor decoration sheets, enabling the floor decoration sheets to have the vibration and sound absorption functions or further include the property of repeated tearing and adhering.

Figure 1:
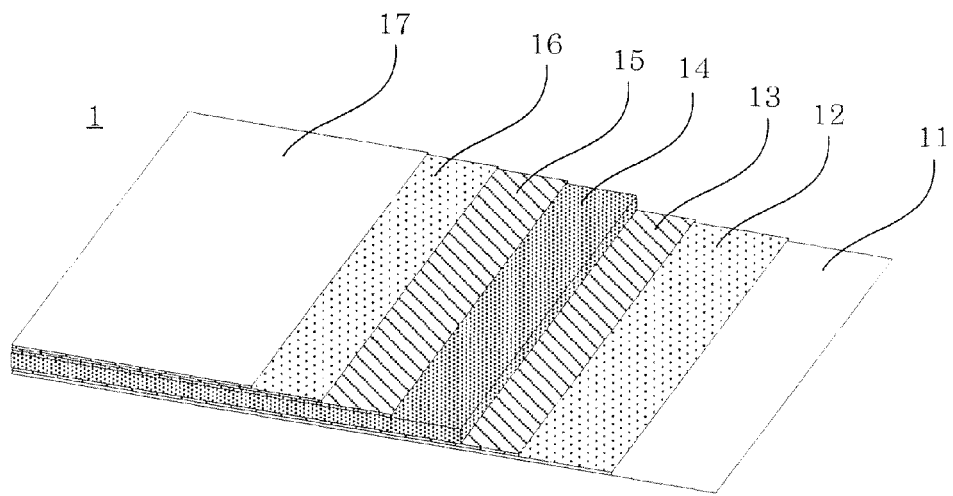
FIG. 1 shows a structural schematic diagram according to a preferred embodiment of the present invention for illustrating the structure of the floor underlay.
Figure 2:
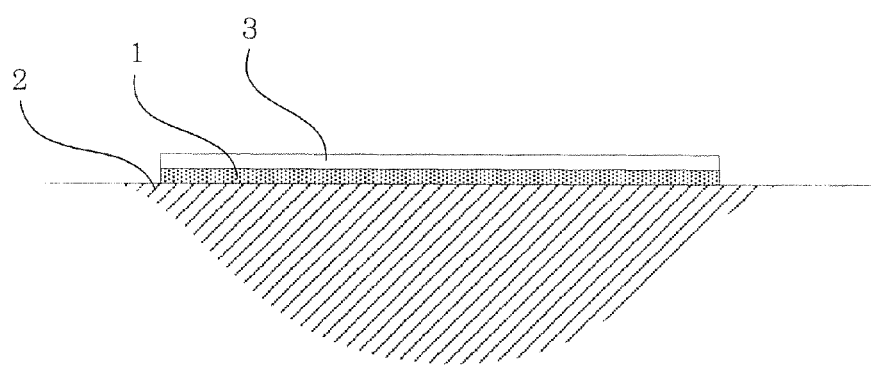
FIG. 2 shows a structural schematic diagram according to a preferred embodiment of the present invention for illustrating the usage status of the floor underlay.

Please refer to FIG. 1 and FIG. 2 first. While using the floor underlay 1 according to the present invention, one surface of the floor underlay 1 is attached to a floor 2 and the other is attached to a floor decoration sheet 3. The structure of the floor underlay 1 comprises a first adhesive layers 11, a support layer 12, a first waterproof layer 13, a multiple-media intermediate layer 14, a second waterproof layer 15, a second support layer 16, and a second adhesive layer 17.

The first adhesive layer 11 is used for adhering to the floor 2. The first support layer 12 is disposed on the first adhesive layer 11. The first waterproof layer 13 is disposed on the first support layer 12. The multiple-media intermediate layer 14 is disposed on the first waterproof layer 13. The second waterproof layer 15 is disposed on the multiple-media intermediate layer 14. The second support layer 16 is disposed on the second waterproof layer 15. The second adhesive layer 17 is disposed on the second support layer 16 and used for adhering to the floor decoration sheet 3.

In the structure of the floor underlay 1 according to the present invention, when the first and second adhesive layers 11, 17 on both surfaces are not attached to the floor 2 or the floor decoration sheet 3, they can be connected with detachable papers, respectively, for protecting their adhesion from pollution or damage. The viscosity of the second adhesive layer 17 can be identical to or different from that of the first adhesive layer 11. If their viscosity values are different, a preferred method is to make the viscosity of the second adhesive layer 17 greater than that of the first adhesive layer 11. By using different viscosity values, the application of the present invention will be more flexible. For example, given that the viscosity of the second adhesive layer 17 is greater than that of the first adhesive layer 11, the floor underlay 1 and the floor decoration sheet 3 are long-term fixed. In the future, when the floor decoration sheet is to be replaced, all one need to do is to tear off the original floor decoration sheet 3. The new floor decoration sheet 3 can still be long-term fixed. The floor underlay 1 and the floor 2 are fixed to maintain no sliding. The user can tear off the two with minimum effort. In addition, the integrity of the floor underlay 1 can be maintained. No residual floor underlay 1 will be left on the floor 2 due to excessively high viscosity.

The material of the first and second support layers 12, 16 is non-woven fabric, which enables the structure of the floor underlay 1 to be supportive and extendable.

Figure 3:
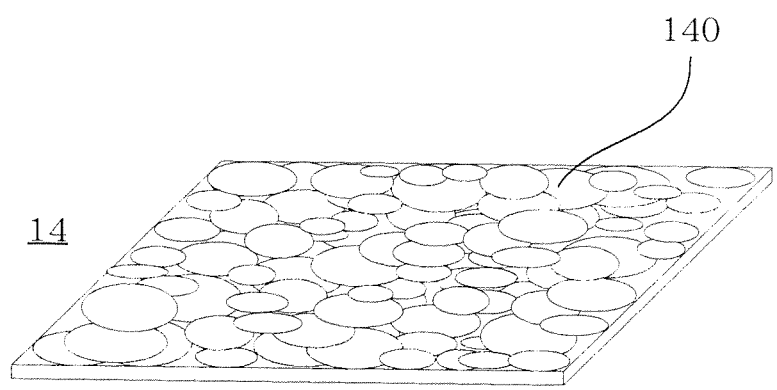
FIG. 3 shows a structural schematic diagram according to a preferred embodiment of the present invention for illustrating the multiple-media intermediate layer.

The multiple-media intermediate layer 14 is formed by mixing a plurality of medium particles. Please refer to FIG. 3. The plurality of medium particles 140 are pressed and forming on a layer consisting of gel and two or more materials. The materials can be selected from rubber, rubber foam, polyurethane, or polyurethane foam, or from recycled rubber, recycled rubber foam, recycled polyurethane, or recycled polyurethane foam. For example, recycled rubber or polyurethane waste can be cut into small pieces and used as the medium particles 140 according to the present invention for fabricating the multiple-media intermediate layer 14. In order to enhance the stability of forming the multiple-media intermediate layer 14 by the medium particles 140, the gel can be further used for connecting the plurality of medium particles 140.

In addition to the medium particles 140, according to the requirements, one or more fiber material, such as bamboo charcoal, wood flour, or shell, can be added to the multiple-media intermediate layer 14. These gradients can absorb volatile organic chemicals such as formaldehyde normally seen in low-quality decoration and improve the sound absorption effect. By using the elastic property of rubber, rubber foam, polyurethane, or polyurethane foam, the multiple-media intermediate layer 14 can have the vibration absorption, sound absorption, flame resistive, and fall prevention functions. In addition, it can absorb the hazardous materials in the air and thus will be helpful in purifying the indoor air.

The first and second waterproof layers 13, 15 on and below the multiple-media intermediate layer 14 can prevent the moisture from the ground or the water sprayed on the floor from permeating into the multiple-media intermediate layer 14 and thus extending the lifetime of the multiple-media intermediate layer 14 by avoiding loss of elasticity due to deterioration, mildew, or rot. The first and second waterproof layers 13, 15 can be formed by coating waterproof glue.

After completing fabrication of the floor underlay 1 according to the present invention, the surfaces of the first and second adhesive layers 11, 12 will be covered with a detachable paper. The detachable paper is easily tearable. The main function of the detachable paper is to protect the adhesive layers from dust before application and facilitate delivery and carrying.

While applying the floor underlay 1 according to the present invention, the detachable paper is first torn off. The first adhesive layer 11 of the floor underlay 1 is attached to the current floor 2, which can be a concrete floor, a terrazzo floor, or a decorated wood or plastic floor. The second adhesive layer 12 of the floor underlay 1 is attached to the floor decoration sheet 3, which is used for decorating the floor. Examples of the floor decoration sheet 3 include plastic, wood, bamboo, and rubber floor decoration sheets. In addition, PVC slices with wood patterns are popular floor decoration sheets 3. If the floor decoration sheets 3 are endowed with some deformation capability, such as plastic or wood sheets, the vibration absorption and fall prevention functions of the floor underlay 1 according to the present invention can be utilized completely. Contrarily, if the floor decoration sheets 3 are tiles or marble slices, the improvement in vibration absorption and fall prevention is limited. However, it still has the sound absorption function.

The floor underlay according to the present invention is used as the medium between the floor and the floor decoration sheets, such that the floor decoration sheets that were attached directly to the floor originally can be added by the user with a layer of auxiliary underlay having specific functions. Under the condition of not influencing the appearance of the ground after decoration, the floor underlay according to the present invention provides varied auxiliary efficacies effectively and enables the laid floor decoration sheets to be safe and comfortable. To sum up, the present invention discloses in detail a floor underlay. Given its functionality, reliability, usage convenience, and environmentally friendly materials, the floor underlay is indeed economical and practical.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A floor underlay, used for joining a floor and a floor decoration sheet, comprising:
   a first adhesive layer, used for adhering to said floor;
   a first support layer, disposed on said first adhesive layer;
   a first waterproof layer, disposed on said first support layer;
   a multiple-media intermediate layer, disposed on said first waterproof layer, and formed by mixing a plurality of medium particles;
   a second waterproof layer, disposed on said multiple-medium intermediate layer;
   a second support layer, disposed on said second waterproof layer; and
   a second adhesive layer, disposed on said second support layer, and used for adhering to said floor decoration sheet.

2. The floor underlay of claim 1, wherein the material of said first support layer and said second support layer is non-woven fabric.

3. The floor underlay of claim 1, wherein the material of said multiple-media intermediate layer comprises two or more materials including rubber, rubber foam, polyurethane, polyurethane foam, recycled rubber, recycled rubber foam, recycled polyurethane, or recycled polyurethane foam.

4. The floor underlay of claim 3, wherein said multiple-media intermediate layer further comprises one or more fiber material.

5. The floor underlay of claim 4, wherein said fiber material includes wood flour, bamboo charcoal, and shell.

6. The floor underlay of claim 1, wherein said multiple-media intermediate layer further comprises a gel for connecting said plurality of medium particles.

7. The floor underlay of claim 1, wherein said first adhesive layer and said second adhesive layer are connected with a detachable paper, respectively.

8. The floor underlay of claim 1, wherein the viscosity of said second adhesive layer is different from the viscosity of said first adhesive layer.

9. The floor underlay of claim 1, wherein the viscosity of said second adhesive layer is greater than the viscosity of said first adhesive layer.

10. The floor underlay of claim 1, wherein said first adhesive layer or said second adhesive layer can be reusable non-setting adhesive.

* * * * *